United States Patent
Wust

[15] 3,701,253
[45] Oct. 31, 1972

[54] DEVICE FOR MOVING CHAIN LINKS IN A RESISTANCE WELDING MACHINE

[72] Inventor: Toni Wust, Cologne-Bickendorf, Germany

[73] Assignee: Meyer, Roth & Pastor, Cologne Raderberg, Germany

[22] Filed: Oct. 7, 1969

[21] Appl. No.: 864,407

[30] Foreign Application Priority Data

Oct. 9, 1968 Germany..........P 18 01 955.1

[52] U.S. Cl....................................................59/31
[51] Int. Cl. ...............................................B21l 3/02
[58] Field of Search...................59/22, 31, 34, 29, 33

[56] References Cited

UNITED STATES PATENTS

| 2,684,422 | 7/1954 | Esser...............................59/31 |
| 3,389,552 | 6/1968 | Kleine...........................59/31 |
| 3,552,118 | 1/1971 | Reiter.............................59/31 |

FOREIGN PATENTS OR APPLICATIONS

| 1,340,047 | 9/1963 | France..........................59/22 |
| 1,185,511 | 2/1959 | France..........................59/22 |
| 1,094,241 | 12/1967 | Great Britain.................59/31 |

*Primary Examiner*—Charles W. Lanham
*Assistant Examiner*—Gene P. Crosby
*Attorney*—Richards & Geier

[57] ABSTRACT

A device is used for moving bent C-shaped links joined into a continuous chain to be welded in a resistance welding machine. The device has an inlet guide and an outlet guide, consisting, for example, of guiding rails. The device also has a saddle moving a link between tensioning tools and supporting it during the welding, as well as a transporting tool for the chain. The device is particularly characterized by the arrangement whereby the saddle is movable relatively to the guides substantially perpendicularly to the direction of movement of the chain link.

8 Claims, 5 Drawing Figures

DEVICE FOR MOVING CHAIN LINKS IN A RESISTANCE WELDING MACHINE

This invention relates to a device for moving bent C-shaped links joined into a continuous chain for welding them in a resistance welding machine. The invention refers more specifically to a device of this type having an inlet guide and an outlet guide, consisting, for example, of guiding rails, as well as a saddle moving a link between tensioning tools and supporting it during the welding and a transporting tool for the chain.

In prior art machines of this type the guide and the saddle move jointly. The guide and the saddle are raised to move the chain into the welding position and are then lowered so that the chain can be transported outside of the welding position.

The straight inlet and outlet guides extend always at an angle, so that the tensioning tools, such as the upsetting steels or tensioning jaws can grasp the link at its rounded portion, particularly in the case of links having a small pitch. The angle between the guides must be sufficiently large to enable the chain to be guided without difficulties around the saddle located at the vertex of the angle. However, the greater the angle, the greater must be the stroke of the two movable tensioning tools. On the other hand, the smaller the stroke of the tensioning tools, the easier and more reliable is the holding of the chain link being welded. A small stroke is particularly desirable for hydraulically operated tensioning tools so as to keep small the expenditure of the hydraulic medium. However, a decisive advantage of a small stroke is the gain in time consumption resulting therefrom.

An object of the present invention is to eliminate the drawbacks of prior constructions by diminishing the stroke of the tensioning tools, namely, by arranging them closer to the welding location and providing a construction which even makes possible the use of a fixed tensioning tool.

Other objects of the present invention will become apparent in the course of the following specification.

In the accomplishment of the objectives of the present invention it was found desirable to make the saddle movable relatively to the guides substantially perpendicularly to the direction of movement of the link. This makes it possible to raise the chain above the vortex into the welding position. In this location the angle between the incoming and outgoing chain strands is smaller, so that it is possible to arrange the tensioning tools closer to the welding position. However, it is not necessary to make smaller the angle between the ingoing and outgoing directions, so that the sliding of the chain in the vortex is not detrimentally affected. On the contrary, if desired, this angle can be made larger than usual without it being necessary to arrange the tensioning tools at a greater distance from the welding position. Thus according to the present invention only the saddle is moved, but not the guides. This results in the substantial advantage that the masses which are being moved are considerably smaller than those of prior art constructions.

According to a further embodiment of the present invention, the chain guiding which heretofore extended perfectly straight, at least within the range of the saddle, can be made circular or elliptical, the crest of the ellipse being preferably located within the range of the saddle. In the case of such a continuously curved guiding, as compared to a straight guiding, the chain will not spring any more at the vortex, but will always slide while lying upon the guide. Furthermore, by using a continuously curved guide, it is possible to locate the entire incoming and outgoing guiding closer to the saddle, thereby saving space. This construction makes it also possible to diminish the stroke of the tensioning tools.

Preferably, the curved portion of the guide is continued as one or two straight incoming and outgoing guides. These guides can be inclined or extend vertically.

It is known to make the guides of two ribs. However, in accordance with the present invention the saddle may consist of a slide, preferably a narrow one, which can move out between these two ribs or be lowered into them. When the slide is lowered, the chain is located between and upon the curved ribs in the range under the welding position as well, so that the entire length of the chain is safely guided during transportation. A slide which is thus constructed has a small mass and therefore requires small actuating forces.

A further advantage results from the narrow construction of the slide, measured perpendicularly to the plane of the chain link being welded, in that no dirt can be deposited between the slide and the back of the chain link, irrespective as to whether the engaging surface of the slide is flat or curved.

It was found that prior saddles having a groove for guiding the back of the link, have the drawback that the groove is coated with welding particles with the results that the chain link is located incorrectly in the welding position and that the transportation of the chain is disturbed. Further difficulties are caused by burr chips and adhesive dirt residues which are deposited in the groove.

According to a further advantageous embodiment of the present invention the slide and the transporting tool are operated jointly, preferably hydraulically. For that purpose, the slide and the transporting tool are moved by separate double acting cylinders, the stroke of the cylinder actuating the transporting tool being shorter than that of the cylinder actuating the slide. The movement of the transporting tool in the direction of transportation is either lagging and preferably equal in speed to that of the slide, or is simultaneous and slower. This way of operating takes into consideration that the path of transportation of the chain is always smaller than the stroke of the slide, caused by different locations of the chain when the slide is moved outwardly or lowered.

In prior machines the transporting tool consists of a finger which extends into one of the chain links located in front of the one which has just been welded, the finger pulling the chain. However, when the welding starts of an unwelded chain or when each n-th link is welded in a continuous operation, for example, in making chain pieces, then after each welding there is a change in the distance between the link which was just welded and the link engaged by the transportation finger, with the result that during automatic chain pulling the location of the finger must be continuously manually adjusted.

According to the present invention this drawback is eliminated by providing a special transporting tool which is preferably jointly actuated with the slide. This transporting tool consists of a forked casing and a doubly operating forked cylinder hydraulically operated jointly with the transporting tool, the cylinder moving a forked jaw clamping the link. The forked jaw must be at least as long as two link separations, so that at least one link can be engaged independently of the location of the chain in the transporting tool. The joint actuation is preferable in order that the forked jaw should be actuated first during the forward movement of the transporting tool and that it should be released first during the rearward movement.

However, the forked jaw can be also moved by a forked cylinder operative solely in the clamping direction and a return spring arranged preferably between the forked jaw and the forked casing.

Movement between the slide and the forked casing can be transmitted purely mechanically as well as mechanically hydraulically. A mechanical-hydraulic transmission of movement can take place with the use of a transporting tool constructed in accordance with the present invention and characterized by an outgoing guide extending parallel or at an angle to the direction of movement of the slide and a driver connected rigidly or pivotally with the slide. The driver carries a piston sliding in an intermediate cylinder of the forked casing, the stroke of which corresponds to the difference in stroke between the slide and the forked casing. Furthermore, a valve is provided having such switching positions that in the clamping position of the forked piston in which the slide and the intermediate piston are located in the lower position, the upper sides of the slide piston and the intermediate piston, as well as the forked piston, are subjected to a predetermined pressure, while the bottom side of the slide piston is subjected to a considerably lower pressure. In addition, the upper sides of the side piston and intermediate piston as well as that of the forked piston are not subjected to pressure in their raised or rearward positions. The forked piston is moved back by the return piston, while the slide piston and the intermediate piston are in their upper positions and the forked casing is moved against a fixed stop. Finally, in the lowered or forward position the higher pressure is applied to the forked piston and the upper sides of the intermediate piston and the slide piston, while a lower pressure is applied to the lower side of the slide piston, whereby the forked piston is located in the champed position and the intermediate piston is located in its lower position, while the slide piston is moved downwardly.

In accordance with a further embodiment of the present invention pertaining to a fixed and a movable tensioning tool, the guide and the saddle, as well as the transporting tool, can be moved in the direction of movement of the tensioning tool with a lesser stroke than that of the tensioning tool, preferably one-half of the stroke. The guide, the saddle and the transporting tool must be moved jointly, particularly when there is a common mechanical-hydraulic transmission of movement between the slide and the forked casing. If the stroke of the tensioning tool is twice as great as that of the guide, of the saddle and of the transporting tool, the tensioning tool is preferably moved with a speed which is twice as great as the speed of the guide, the saddle and the transporting tool, so that the two tensioning tools will engage the chain link at the same time, thereby avoiding the turning of the link.

More particularly, a device having a fixed and a movable tensioning tool can be provided with a fixed lever engaging the movable tensioning tool and extending substantially perpendicularly to its direction of movement. A rod extending substantially parallel to the direction of movement of the tnesioning tool is pivoted to this lever, while the other end of the rod engages a part connecting the guide, the saddle and the transporting tool. The lever is pivoted to the tensioning tool by an elongated hole so that when the tensioning tool is moved, the changes in length between the moved end and the fixed end of the lever can be compensated. When the rod is pivoted to the middle of the lever, the guide, the saddle and the transporting tool will move substantially with one-half of the speed of the tensioning tool.

Various other slower or faster movements of the guide, the saddle and the transporting tool relatively to the tensioning tool can be attained by a device having two fixed two-armed rocking levers the adjacent ends of which are interconnected through elongated holes and which extend substantially perpendicularly to the movable tensioning tool. The free end of one of these levers engages the movable tensioning tool through an elongated hole, while the free end of the other lever is connected by an articulated rod with the part connecting the guide, the saddle and the transporting tool. Different speeds are attained by suitably selecting the lever lengths of the two rocking levers.

A movement of the guide, the saddle and the transporting tool or the tensioning tool, which has the same speed but extends over different lengths, can be produced by a spring device which presses in the welding position the guide, the saddle and the transporting tool or the part which joins them, and by an adjustable stop upon the rod to set the welding position of the guide, the saddle and the transporting tool relatively to the fixed tensioning tool, as well as a free motion driver located between the transmission lever or levers extending toward the movable tensioning tool and the rod end adjacent thereto. Preferably, the rod extends through a fixed part engaged by the spring device as well as the stop.

In accordance with the present invention the greatest distance between the movable tensioning tool on the one hand and the guide, the saddle and the transporting tool on the other hand, is set by an adjustable driver stop at the end of the rod. The distance must be sufficiently great so that after the welding the upsetting movement can be carried out. The free motion driver required for this purpose can be also connected to the movable tensioning tool.

The invention will appear more clearly from the following detailed description when taken in connection with the accompanying drawings, showing, by way of example only, preferred embodiments of the inventive idea.

IN THE DRAWINGS

Figure 1:
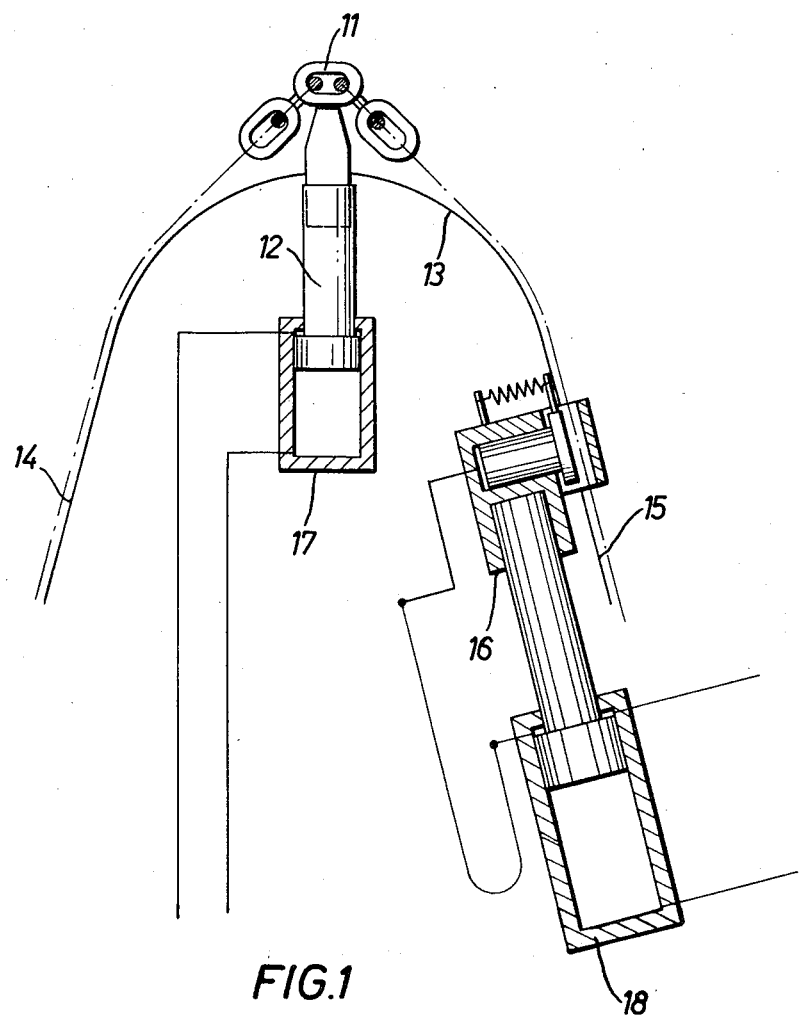
FIG. 1 is a diagrammatic sectional view of a device having a common hydraulic actuating means.

The device shown in FIG. 1 has a slide 12 movable at right angles to the direction of movement of a chain link 11. A guide 13 is uniformly curved in the shape of a circular arc. The curved portion of the guide 13 is continued as a straight incoming guide 14 and a straight outgoing guide 15. The guides 13, 14 and 15 have the shape of parallel rods. The slide 12 can be moved outwardly between the guides or be lowered into them. The slide 12 is moved by a double acting cylinder 17, while the transporting tool 16 is moved by a similar double acting cylinder 18, the stroke of the transporting cylinder 18 being shorter than the stroke of the slide cylinder 17. The common hydraulic device for actuating the slide 12 and the transporting tool 16 is only diagrammatically indicated in FIG. 1. This hydraulic device can be used to vary the movement of the transporting tool 16 in the direction of transportation relatively to the movement of the slide 12, so that the tool will move either with a lag and preferably with the same speed, or simultaneously and slower than the slide. The incoming guide 14 and the outgoing guide 15, and thus also the transporting tool 16 and the transporting cylinder 18, extend at an angle to the direction of movement of the slide 12, so that the chain can lie properly upon the guides 14 and 15.

Figure 2:
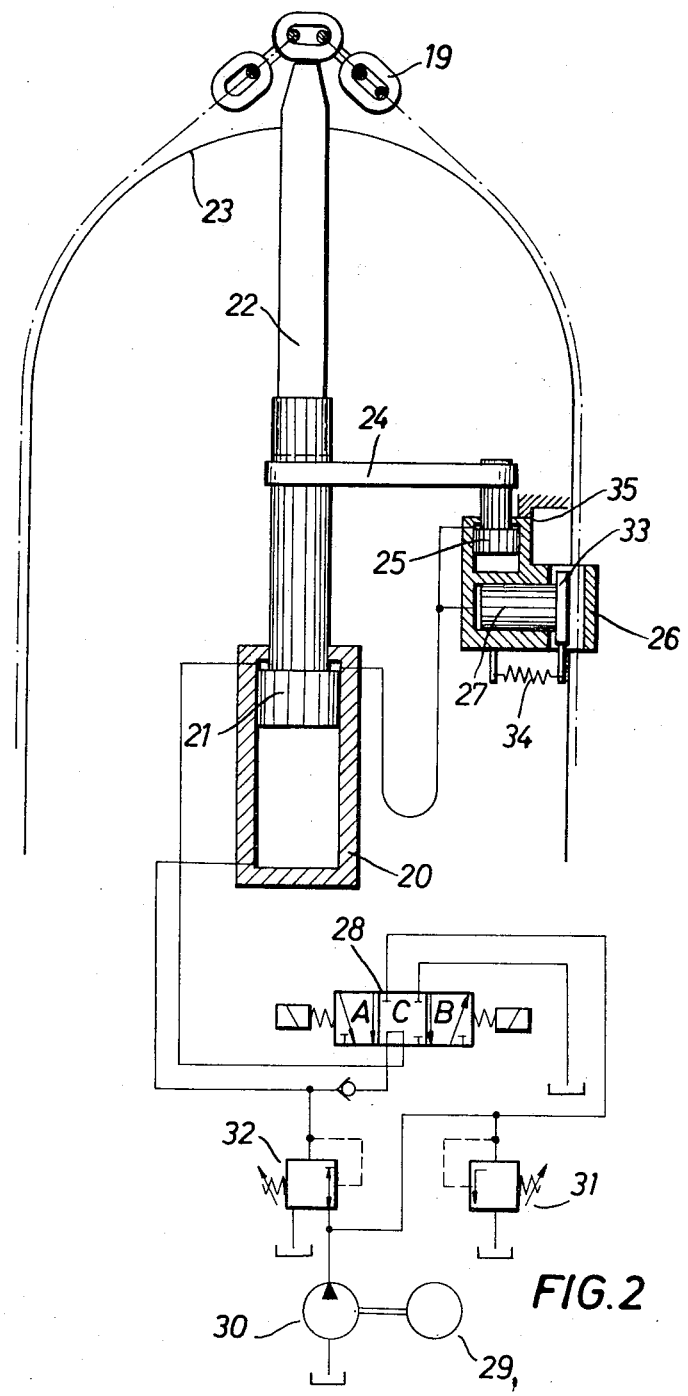
FIG. 2 is a diagrammatic view, partly in section, of a device having common mechanical-hydraulic actuating means.

FIG. 2 illustrates a device by means of which advantageous directions of movement can be carried out. These movements take place as follows:

At the end of the transportation movement of the chain 19, the slide piston 21 located in the slide cylinder 20, will be in its lowermost position, so that the slide 22 connected with the piston 21 is lowered below the rods within the guide 23. A driver 24 firmly connected with the slide 22, is also so connected through an intermediate piston 25 with a forked casing 26 having a forked piston 27, that the forked casing 26 can be moved relatively to the slide 22 according to the stroke of the intermediate piston 25 in the forked casing 26. During a further movement of the slide piston 21 the intermediate piston 25 is in its end position in the forked casing 26, so that the forked casing 26 is coupled with the slide 22. In this position the valve 28 of the hydraulic system is in the switching position A, so that pressure produced in a pump 30 by a motor 29 and determined by a pressure limiting valve 31, is applied to the upper surface of the slide piston 21, the upper surface of the intermediate piston 25 and upon a surface of the forked piston 27. Considerably smaller pressure determined by another pressure diminishing valve 32 is applied to the opposite side of the slide piston 21. The forked jaw 33 moved by the forked piston 27 will thus firmly clamp the chain 19.

Due to the automatic connections of the machine, as soon as the chain 19 is raised, the valve 28 will be moved into the switching position B. Oil in front of the upper surface of the slide cylinder 21 will be without pressure and the return spring 34 will open the forked jaw 33. The force exerted upon the lower surface of the slide piston 21 and produced by pressure set by the pressure diminishing valve 32, will cause the slide 22 to start its downward movement in the guide 23. After the intermediate piston 25 has completed its movement in the forked casing 26, the casing 26 will be taken along. Finally, the unwelded chain link lying upon the guide 23 will be engaged and raised into the welding position. The upper end of the stroke of the slide 22 is determined by a stop 35 of the forked casing 26. During welding the valve 28 is located in the switching position B.

FIG. 2 shows the device in the position after the completion of the welding. In this position the valve 28 is located in the switching position C, the forked piston 27 is held and the chain 19 is clamped. Thereupon the valve 28 is moved again into the switching position A. Then pressure from the pressure limiting valve 31 is increased over the upper space of the slide cylinder 20 in front of the forked piston 27. The upper surfaces of the slide piston 21 and the intermediate piston 25, as well as the surface of the forked piston 27, are so related to each other that the chain 19 remains clamped by the forked jaw 33. Due to this pressure, the slide 22 will start its lowering movement. Since the chain 19 will then lie upon the guide 23, the slide 22 will have to move for a longer stretch than the forked casing 26. Consequently the intermediate piston 25 will move in the forked casing 26 down opposite to the stop and only then it will take along the forked cashing 26 and the chain 19 in accordance with the movement of the slide 22. The operation is terminated in the lower position of the piston 21 and then the procedure is started again by switching the valve 28 into the switching position B.

Figure 3:
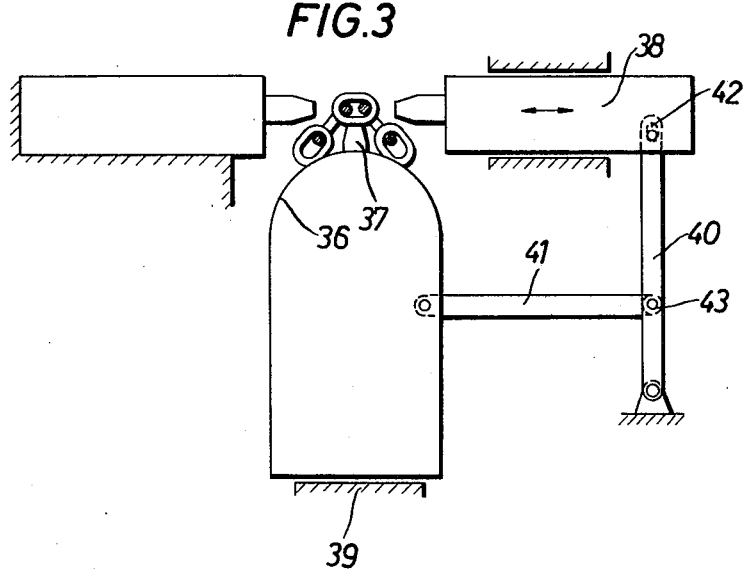
FIG. 3 is a diagrammatic side view of a device having a fixed tensioning tool and a lever.

FIG. 3 illustrates a device with a movable tensioning tool and a fixed tensioning tool which is simpler in construction than a device with two movable tensioning tools. In accordance with this embodiment of the present invention the guide 36, the saddle 37 and the transporting tool (not shown) are movable in the direction of movement of the tensioning tool 38 by a stroke smaller than that of the tool to the extent of about one-half, relatively to the machine casing 39. A fixed lever 40 engages the tensioning tool 38 and extends perpendicularly to its direction of movement. A rod 41 pivoted to the lever 40 extends substantially parallel to the direction of movement of the tensioning tool and its left end (looking in the direction of FIG. 3) is connected to a part (not shown) which interconnects the guide 36, the saddle 37 and the transporting tool (also not shown). In order to compensate for the change in length between the fixed and the movably mounted ends of the lever 4D, which is produced during the movement of the tensioning tool 38, the movably mounted end of the lever is connected to the tensioning tool 38 by an elongated hole 42. The difference in speeds between the tensioning tool 38 and guide 36, the saddle 37 as well as the transporting tool, can be varied by the selection of the location of the pivot 43 connecting the lever 40 with the rod 41.

Figure 4:
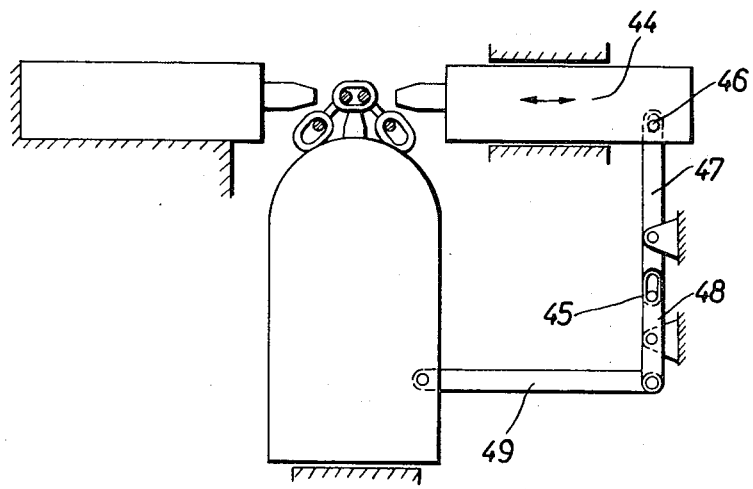
FIG. 4 is a diagrammatic side view of a device having two rocking levers.

FIG. 4 illustrates another construction which makes it possible to produce a greater speed of the guide, the saddle and the transporting tool relatively to the movable tensioning tool 44. In this construction the movable tensioning tool 44 is connected with two fixed two-armed rocking levers 47 and 48 the adjacent ends of which are joined through an elongated hole 45. These levers extend substantially perpendicularly to the movable tensioning tool 44 and their connection with the tool 44 is effected through an elongated hole upon the free end of the upper lever 47. The free end of the other lever 48 is connected by a rod 49 with the guide, the saddle and the transporting tool (not shown). The speeds of the tensioning tool 44, the guide, the saddle and the transporting tool are fixed by a corresponding selection of the lengths of the levers 47 and 48.

Figure 5:
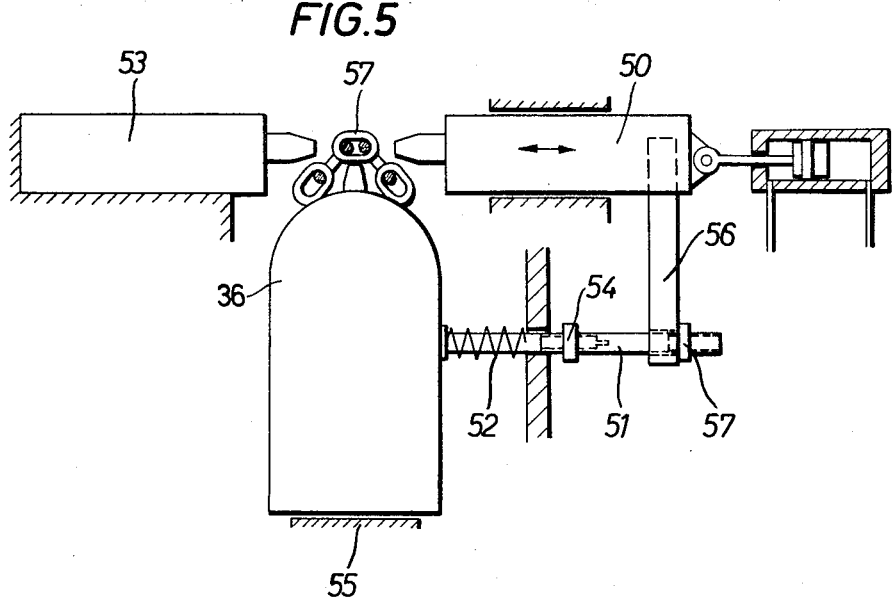
FIG. 5 is a diagrammatic side view of a device provided with a spring arrangement.

FIG. 5 illustrates a construction which provides equal speeds for the tensioning tool 50, the guide, the saddle and the transporting tool (not shown). A rod 51 is connected with the guide, the saddle and the transporting tool. The rod 51 carries a spring 52 which presses the rod in the direction toward the fixed tensioning tool 53 up to the adjustable stop 54 relatively to the machine casing 55. The rod 51 is connected with the movable tensioning tool 50 through a driver 56. The stop 54 is so set that when it is engaged the chain link 57 will also engage the fixed tensioning tool 53. During welding, namely, after the chain link 57 has been fixed between the tensioning tools 50 and 53 and also during upsetting, that is when the tensioning tools 50 and 53 have moved closer to each other, the driver 56 is freely movable upon the rod 51. The adjustable driver stop 57' upon the end of the rod 51 is used to set the largest distance between the movable tensioning tool 50 on the one hand and the guide, the saddle and the transporting tool on the other hand.

As shown in FIG. 5 the tool 50 is connected by a rod to a piston 50'. The cylinder containing the piston 50' is provided with conduits on opposite sides to that the piston 50' is movable in opposite directions. Thus the piston 50' moves the guide 36, namely, both guiding parts against the fixed tensioning tool 53 and also moves the movable tool 50 against the fixed tool 53. The movement of the guide 36 takes place from an initial position (not shown) in which the link 57 lies against the fixed tool 53 by the action of the spring 52. The guide 36 moves to the right by the action of the piston 50', the movable tool 50, the driver 56 and the rod 51 against the action of the spring 52, whereby the end positions of the guide 36 relatively to the casing floor 55 are provided by setting the stops 54 and 57'. Thus the guide 36 with all its parts including the slide is located initially at the fixed tool 53 while the movable tool 50 is pulled to the right by its piston. Only after the piston 50' has moved beyond a certain point it moves in the second half of its movement through the movable tool 50 and the driver 56, as well as the stop 57', the rod 51 and thus the entire guide with all the pertaining parts, so that in the end position of the piston 50' in which it strikes a stop (not shown) the distance of the link 57 and of the guide 36 with all the parts connected therewith, from the fixed tool 53 is the same as that from the movable tool 50. This position is shown in FIG. 5.

In the construction of FIG. 5 the rod 51 cooperates with a spring 52 and a stop 54. However, the rod 49 shown in FIG. 4 and the rod 41 shown in FIG. 3 can be also provided with a similar spring and stop.

While in the constructions of FIGS. 3, 4 and 5 the guide, the saddle and the transporting tool were actuated by systems of levers and rods, they can be also moved horizontally by a hydraulically operated cylinder or some other suitable drive. Preferably the common movement of the guide, saddle and transporting tool is actuated jointly with the individual movements of the saddle and the transporting tool.

I claim:

1. A device for moving a chain composed of interconnected bent C-shaped links for welding in a resistance welding machine, said device comprising a two part chain guide, the first part supporting the chain in a position wherein one of its links is welded, the second part moving the chain away from said position, tensioning tools holding a link in the welding position, a transporting tool moving the chain along said guide parts, a slide moving said link between said tensioning tools and supporting it during welding, means moving said slide relatively to said guide parts in a direction substantially perpendicular to the direction of movement of said chain, the two guide parts being symmetrical to a plane extending through the axis of the slide, and a drive comprising a forked casing, a forked piston located in said casing, a forked jaw connected with said piston, said drive actuating said piston jointly with said transporting tool and causing said jaw to clamp the chain, said jaw having the shape of an elongated member the length of which is at least equal to that of two interconnected lines, said casing having an elongated clamping surface located opposite said jaw.

2. A device in accordance with claim 1, said drive further comprising a return spring between said jaw and said casing.

3. A device in accordance with claim 1, said drive further comprising means connecting said slide with said forked casing for mechanical transmission of movement.

4. A device in accordance with claim 2, said drive further comprising a driver connected with said slide, a slide piston connected with said slide, an intermediate piston connected with said driver, an intermediate casing enclosing said intermediate piston and connected with said forked casing, the stroke of said intermediate piston being equal to the difference in strokes of the slide and the forked casing, a stop located adjacent said forked casing, a valve having a plurality of switching positions and means connecting said valve with said pistons and casings, whereby a. in one position of said valve which is the clamping position of the forked piston and in which the slide piston and the intermediate piston are located in their lowermost positions, the upper surfaces of the slide piston and of the intermediate piston and the surfaces of the forked piston being subjected to predetermined hydraulic pressure, while the lower surface of the slide piston is subjected to a substantially lesser hydraulic pressure;

b. in another position of said valve which is the rising or rearward position of the device, the upper surfaces of the slide piston and of the intermediate piston and the surfaces of the forked piston are not subjected to any hydraulic pressure, said return spring holding back the forked piston, the slide piston and the intermediate piston being in their uppermost positions and the forked casing engaging said stop; and c. in yet another position of said valve which is the lowered or forward position of the device, the forked piston and the upper surfaces of the intermediate piston and of the slide piston are subjected to higher hydraulic pressure and the lower surface of the slide piston is subjected to lower hydraulic pressure, the forked piston being in the clamping position, the intermediate piston being in the lowermost position and the slide piston moving downwardly.

5. A device in accordance with claim 1, wherein said tensioning tools consist of a fixed tensioning tool and a tensioning tool movable relatively to said fixed tensioning tool, and having means moving said guide, said slide and said transporting tool in the direction of movement of said movable tensioning tool but with a substantially lesser stroke.

6. A device in accordance with claim 5, wherein said means comprise a driver lever connected to said movable tensioning tool and extending substantially perpendicularly to its direction of movement, a movable rod connected to said lever and extending substantially parallel to the direction of movement of said movable tensioning member, a spring, a stop adjustably mounted upon said rod and a driver stop adjustably mounted upon said rod.

7. A device in accordance with claim 6, wherein said driver stop is adjustably mounted upon said rod close to an end thereof.

8. A device in accordance with claim 5, comprising a driver stop connected with said movable tensioning tool.

* * * * *